United States Patent

Pignata et al.

[11] Patent Number: 5,817,259
[45] Date of Patent: Oct. 6, 1998

[54] CONTROLLED COOLING OF MOULDED BOAT HULL STRUCTURE

[75] Inventors: Rich Pignata, Raleigh; Mark White, Durham, both of N.C.

[73] Assignee: Allied Logic Corporation, Durham, N.C.

[21] Appl. No.: 726,241

[22] Filed: Oct. 4, 1996

[51] Int. Cl.[6] .......................... B28B 11/00; B29B 17/00
[52] U.S. Cl. .................. 264/40.5; 264/232; 264/348
[58] Field of Search .................................. 264/40.5, 232, 264/348, 310

[56] References Cited

U.S. PATENT DOCUMENTS 5,382,156  1/1995  Hayashi ........................ 425/436 R
5,458,844  10/1995  MacDougall .......................... 264/310

Primary Examiner—Christopher A. Fiorilla
Attorney, Agent, or Firm—Abelman, Frayne & Schwab

[57] ABSTRACT

A method and apparatus is provided for controlling the reconfiguration of a moulded boat hull structure as it is cooled from its moulding temperature to ambient temperature. A dynamic cooling fixture is utilized having movable panels that support substantially the entire inner and outer hull surfaces during the entire cooling process. This results in the cooling of the hull in a manner which will be devoid of wrinkles, depressions, or other disadvantageous discontinuities.

10 Claims, 5 Drawing Sheets

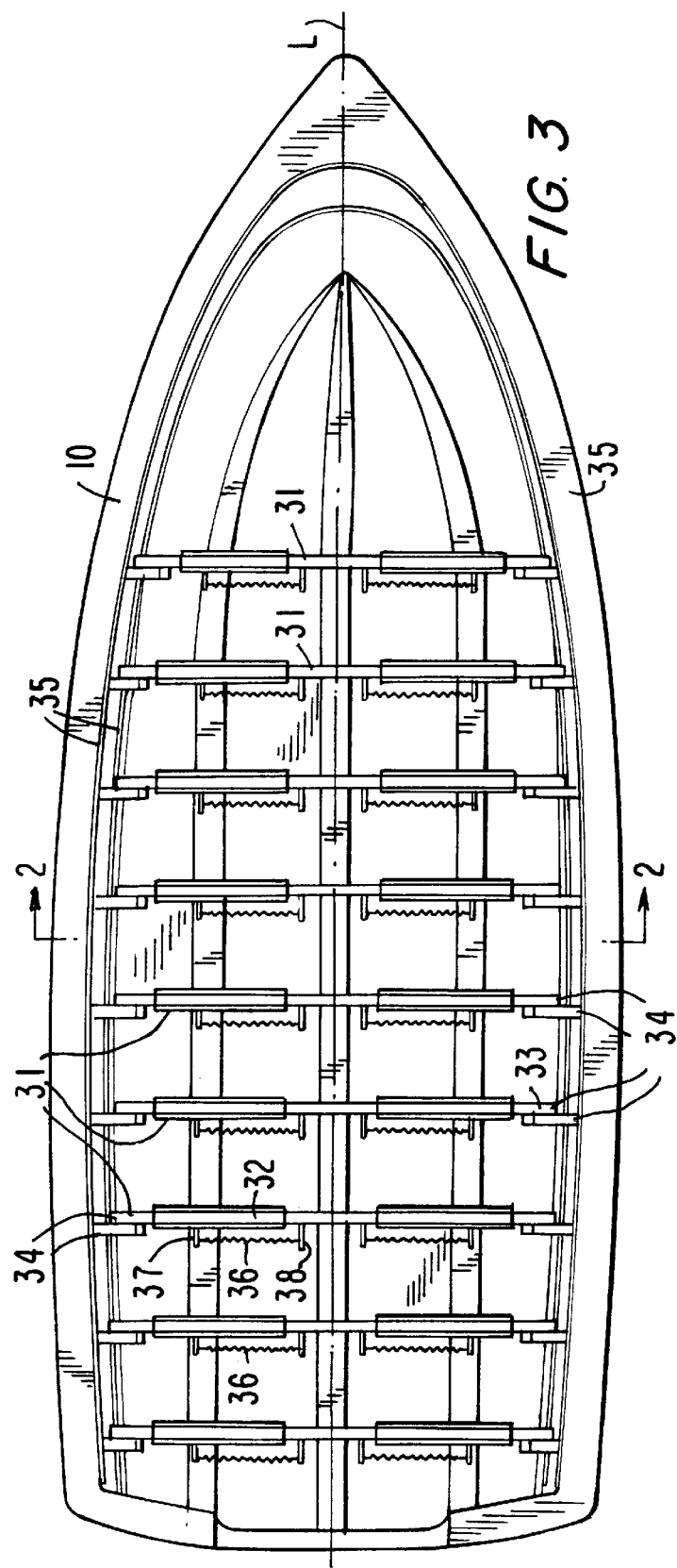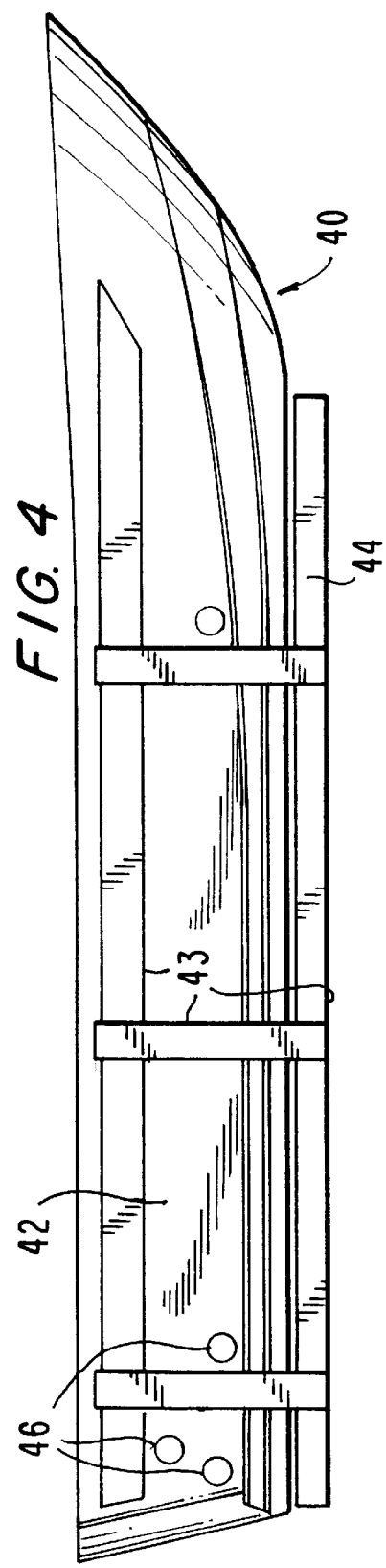

CONTROLLED COOLING OF MOULDED BOAT HULL STRUCTURE

FIELD OF THE INVENTION

This invention relates to a method and apparatus for controlling the reconfiguration of a moulded boat hull structure as it cools from the moulding temperature to ambient temperature. Such reconfiguration results from thermal shrinkage of the plastic material forming the boat hull. The present invention is particularly adaptable for use in conjunction with the manufacture of a rotary moulded boat hull structure of the type shown in U.S. Pat. No. 5,458,844, in which the boat hull is unitarily moulded to form peripherally joined inner and outer shells, with a plurality of longitudinally extending stiffening members between the inner and outer shells. In accordance with the present invention, after the moulded hull is formed, a method and apparatus is provided to support the hull while it cools down to ambient temperature, with such support controlling the reconfiguration of the hull surfaces during shrinkage, such that the resultant cooled end product will be smooth and devoid of wrinkles, depressions, warping or other disadvantageous discontinuities.

DESCRIPTION OF THE PRIOR ART

As is well known, plastic materials have a coefficient of thermal expansion which results in their shrinking as they cool down from the elevated moulding temperature to ambient temperature. Such a temperature transition, which may be in the order of over 100° F. for boats of moderate size, and have a duration of over two hours, may typically exhibit shrinkage in the order of 3%. While the complementary mould members which form the moulded hull have smooth surfaces configured to correspond to the final product, the shrinkage of the boat during post moulding cooling can result in wrinkles, depressions, warpage or other undesirable deformities occurring in the ambient temperature finished product. This is particularly likely to occur as the boat hull comes larger in size, and/or the non-uniform distribution of plastic materials at different portions of the hull results in heat sinks, or otherwise causing uneven dissipation of heat during the cooling process.

It is known to physically support the boat hull during post moulding cooling, to minimize distortion during the final cooling stage. However, this is typically done with a fixed size jig made of a rigid material such as wood or metal. The jig generally corresponds to the desired ambient configuration of the boat after cooling has been completed. Because of the differential size of the moulded boat hull when it is first placed in such a fixed size jig (upon removal at its elevated temperature, from the mould members), the jig will not initially come in full contact with the boat hull surface. As the boat hull cools, and shrinks, it will not be fully supported by the jig until it is close to ambient temperature. This can result in surface discontinuities, while not achieving the desired overall smooth surface configuration.

SUMMARY OF THE INVENTION

The static, fixed size prior art support jig is now replaced with a dynamic cooling assembly which includes a series of movable members which, under the influence of appropriate forces, maintain substantial contact with both the inner and outer boat surfaces a) during the initial emplacement of the elevated temperature moulded hull within the cooling assembly, b) while it cools to the lower ambient temperature, and c) at the ambient temperature. Thus, the boat hull is appropriately supported throughout the entire cooling period.

More specifically, the present invention, which provides an apparatus for the controlled reconfiguration of a moulded boat hull during cooling induced shrinkage between the elevated moulding temperature and the cooler ambient temperature, includes a cooling assembly having independently operable, and separate, inner and outer hull cooling fixtures. Each of the hull cooling fixtures includes movable surface panels which contact the respective hull surfaces during the entire cooling period. During this cooling period the plurality of surface panels which form the inner cooling fixture are biased outwardly, while the plurality of surface panels which form the outer cooling fixture are biased inwardly. The biasing force may typically be provided by a tension member, such as a spring, elastic "bungee" cord or air cylinder. This movement as induced by the biasing forces acts in conjunction with the cooling characteristics of, and resistance offered by, corresponding portions of the moulded hull surface to maintain appropriate shaping forces against the hull to achieve a smooth transition to its somewhat smaller ambient temperature configuration.

Advantageously, at least with respect to the inner hull reconfiguration, a semi flexible wall member is interposed between the individual outwardly biased surface panels and the interior surface of the hull. The interposition of this semi-flexible wall, which is coextensive with a plurality of the individual surface panels, provides for a smoother transition of the inner hull surface during cooling, as contrasted to each of the spaced surface panels directly contacting the inner hull surface at spaced locations. Further, it has been found advantageous to maintain a low air pressure, which may be on the order of less then one psi, within the hollow hull (between its inner and outer surfaces) during the dynamic movement of the surface panels as the hull shrinks throughout the cooling process. The maintenance of such counter pressure within the hull serves to enhance the continual contact between the surfaces of the cooling assembly and the hull, as the hull shrinks in size, thereby aiding in the prevention of warping, ripples, buckling or other deleterious surface discontinuities.

Accordingly, it is a primary object of the present invention to control the reconfiguration of a moulded boat hull during thermally induced shrinkage from the elevated moulding temperature to ambient temperature.

A further object of the present invention is to provide such a method for controlling the boat hull reconfiguration during cooling, which includes the utilization of a cooling assembly, which comprises a plurality of individual inner and outer hull surface panels which move during the cooling process in accordance with the dimensional changes of the boat hull.

Another object of the present invention is to provide such a method for controlling the reconfiguration of a moulded boat hull as it is cooled following the moulding process, which is particularly adaptable for a unitary, rotationally moulded, boat hull.

Yet another object of the present invention is to provide a fixture for controlling the cooling of a moulded boat hull, after the boat hull is removed from its mould at an elevated temperature, in a manner that controls the reconfiguration of the moulded boat hull surfaces during shrinkage, to maintain a smooth contour devoid of undesirable buckling, wrinkles, warping or other discontinuities.

Still a further object of the present invention is to provide such an apparatus, for controlling the cooling of the just moulded boat hull, which includes a plurality of individual movable panels which maintain contact with, and move in accordance with, the dimensional changes of the boat hull as it cools from the elevated oven moulding temperature to ambient temperature.

These as well as objects of the present invention will become apparent upon consideration of the following description and drawings.

A BRIEF DESCRIPTION OF THE DRAWINGS

FIG. 3 is a top view of the boat hull within the inner hull cooling fixture.

FIG. 4 is a side view of the outer hull cooling fixture.

DETAILED DESCRIPTION

Figure 1:
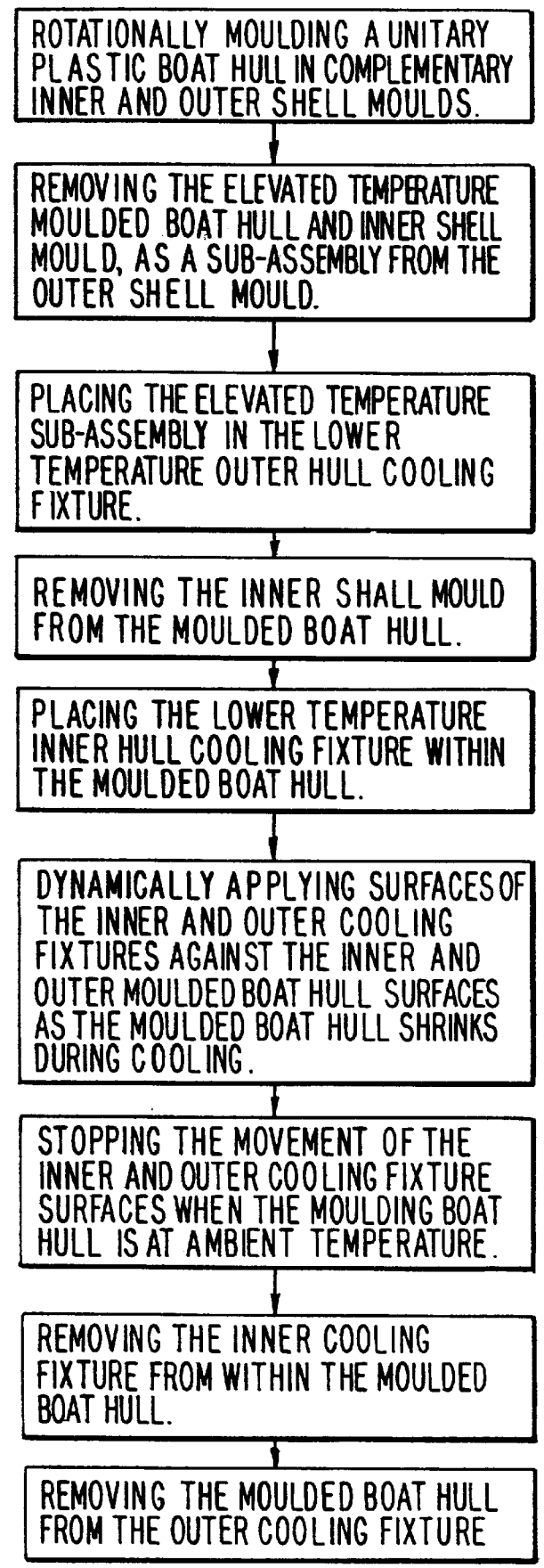
FIG. 1 is a block diagram showing the steps in accordance with the method of the present invention.

Referring initially to FIGS. 2–5, the method and apparatus of the present invention has found particular applicability within respect to the cooling of a unitary, rotationally moulded, boat hull structure as typically manufactured in accordance with aforementioned U.S. Pat. No. 5,458,844, the subject matter of which is incorporated herein by reference. The rotationally moulded boat hull 10 includes an outer hull surface 12 and an inner hull surface 14 which are peripherally joined during the moulding process along juncture 16. The hull 10 preferably includes a plurality of longitudinally extending reinforcement members 18. The upper surfaces 20 of reinforcement members 18 are advantageously within the same horizontal plane as the inward ledges 22, upon which the deck, or transverse stiffening members as disclosed in U.S. patent application Ser. No. 08/561,418 of Nov. 21, 1995 now U.S. Pat. No. 5,634,425, may be secured (neither of which is shown herein for purposes of clarity).

The hull 10 may be rotationally moulded between a pair of complementary inner and outer shell moulds (not shown) which are described in the aforementioned U.S. Pat. No. 5,458,844. After the moulding process is completed, the moulded boat hull 10 must naturally be removed from the complementary shell mould. The just moulded boat hull 10 is typically formed of low density linear polyethylene which is placed within the mold in powder form and then brought to a moulten state during the moulding operation. Thus, at the time boat hull 10 is to be removed from the mould it may typically be at an elevated temperature in the order of 160°–170° F. It is naturally understood that this temperature would vary depending upon the particular characteristics of the moulded hull being formed, the moulding process and the material forming the hull. As the boat hull 10 is subsequently brought to an ambient temperature there will be shrinkage of the boat hull. For example, a boat hull having an ambient length of seventeen feet might typically be approximately one foot longer at the time of moulding. Similarly, the width of such a boat would be greater within the mould. The shrinkage of the boat during cooling to the ambient conditions occurs over the entire surface of the boat hull. Further, since the plastic material is of differing thicknesses and of varying concentrations at different regions of the boat, the shrinkage may not be uniform, with regions of greater amounts of plastic tending to operate as a heat sink during cooling. Thus, the shrinkage may not be uniform over the full expanse of the boat.

Recognizing the need to support the boat hull during the cooling stage to prevent distortion, it is known to place the boat hull within a cooling fixture. Such cooling fixtures have, in the past been of a fixed size which is typically equal to or slightly larger than the final boat size and configuration. However, since the boat hull is initially placed within such a fixture when only a small percentage of the cooling shrinking has occurred, such prior art fixtures will not come in full contact with the boat hull until the very end of the cooling process. Hence, the discontinuity of the support provided by such cooling fixtures has been found to result in the undesirable variations from the optimum smooth surface configurations. Such deviations could be in the form of buckling, warpage or surface undulations.

Figure 5:
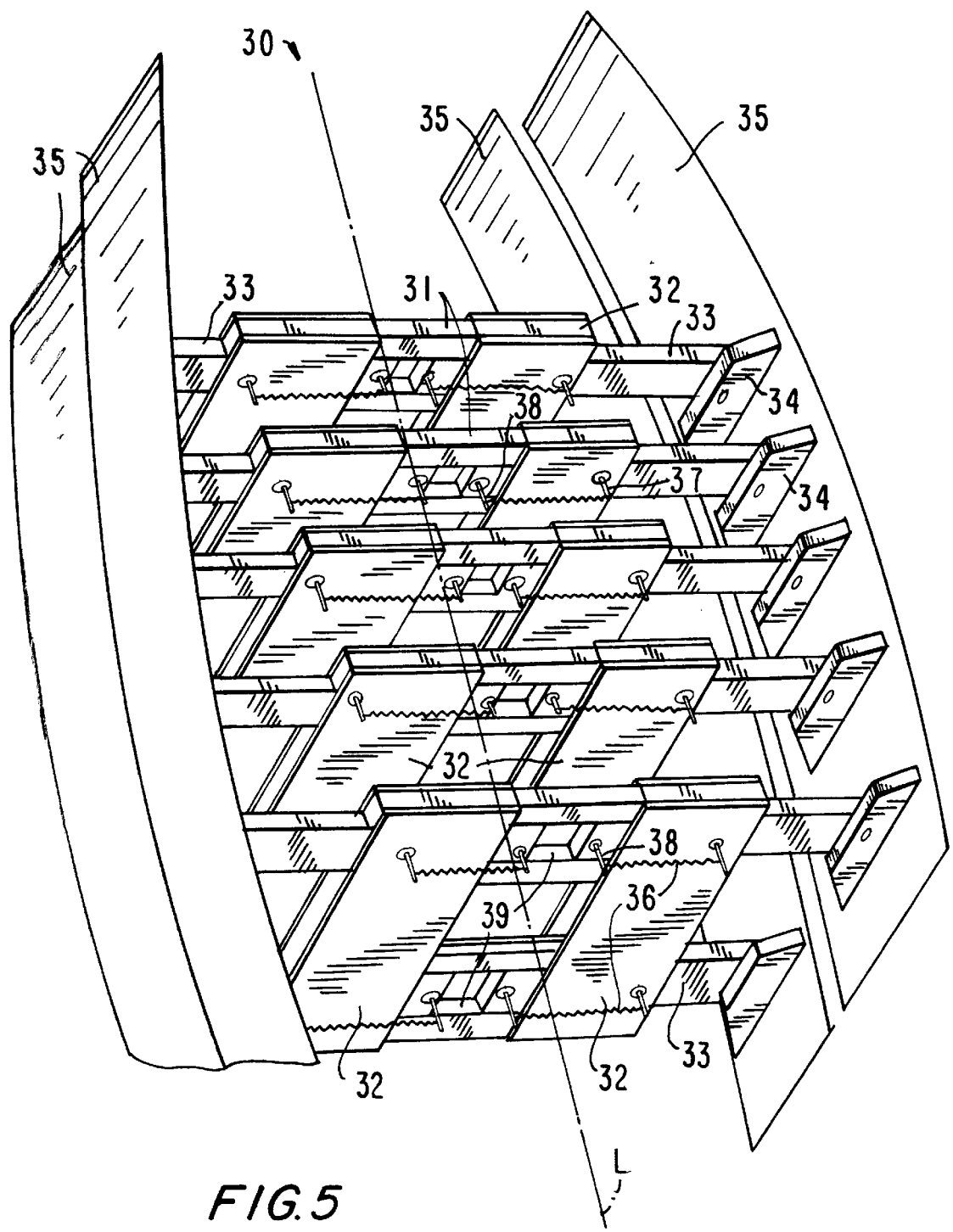
FIG. 5 is a perspective view, looking down, of the inner hull cooling fixture.

In accordance with the present invention a dynamic cooling assembly is provided which includes separate and independently operable inner 30 and outer 40 hull cooling fixtures. Considering first the inner hull cooling fixtures 30, there is provided a spaced plurality of subassemblies 31 which may be equally spaced along the length of the hull, as best shown in FIGS. 3 & 5. Each such subassembly 31 includes a pair of stationary frame members 32 on opposed sides of the longitudinal axis L of the boat hull 10. Extending outward from each frame 32 is at least one articulating arm 33. In the particular embodiment shown herein two such rows, of vertically displaced, arms 33 extend outward of each stationary frame 32. It is naturally understood that the number of rows of such arms 33 would vary in accordance with the size, configuration and other characteristics of the boat hull whose shrinkage is being controlled. At the free end of each arm 33 an individual surface panel 34 is provided. While the surface panels 34 may be in direct contact with the interior boat hull surface 14, it is preferable that an intermediary semi-flexible wall 35 be provided. Parts 33 and 34 may typically be formed of wood, and the intermediary wall 35 of fiberglass. It should be understood that other materials maybe utilized, with this example being provided for illustrative purposes only.

Figure 2:
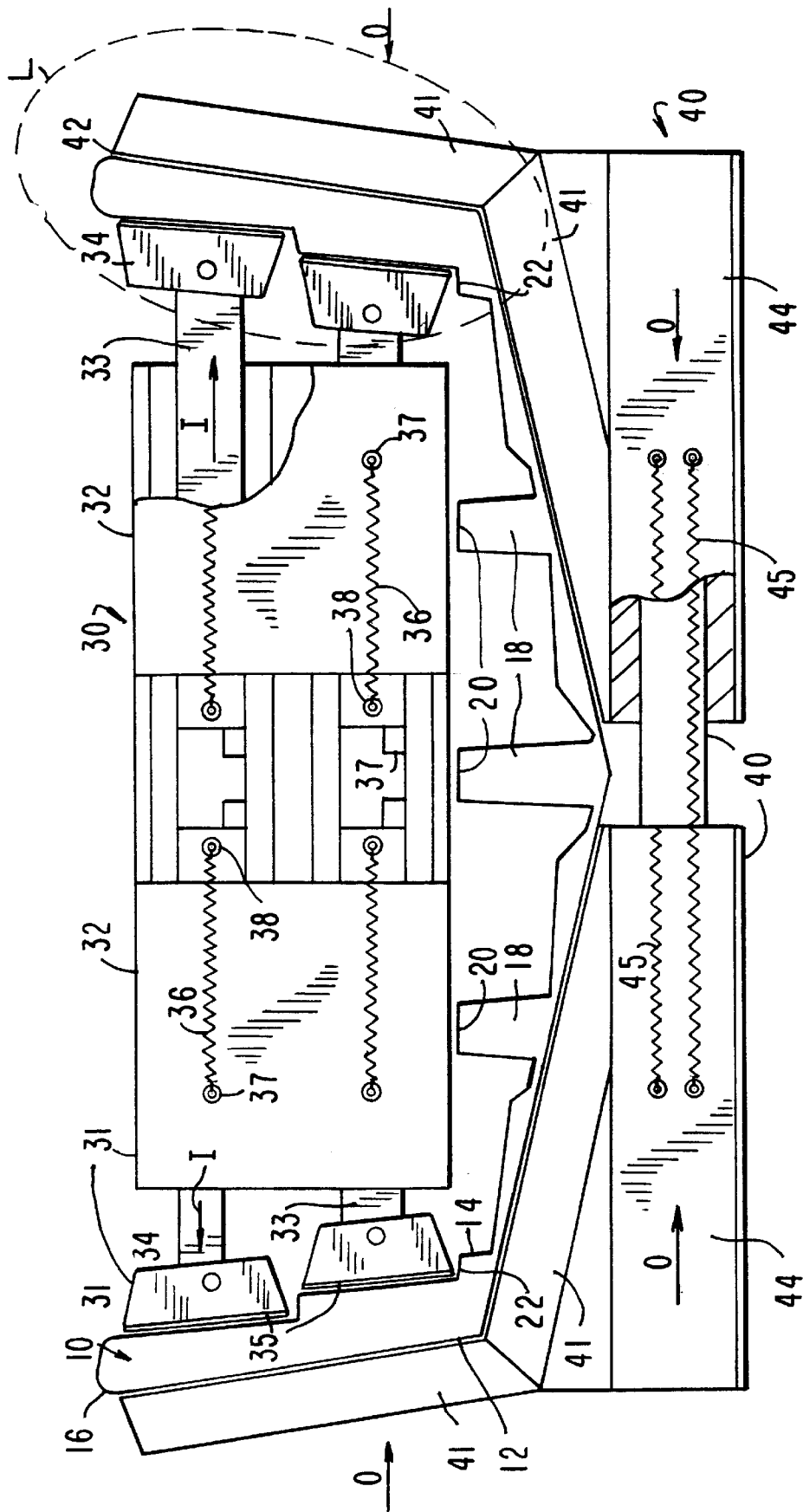
FIG. 2 is cross sectional view, along the lines 2—2 of the FIG. 3, and looking in the direction of the arrows, showing the placement of the moulded boat hull within the cooling assembly during the cooling process.

The arms 33 can independently move outward with respect to the stationary 32 frame and are connected thereto with a biasing means 36, which may typically be a tension spring. Alternatively an elastic "bungee" type cord, air cylinder, or other suitable biasing means may be utilized. One end of the spring 36 is connected to the stationary location 37 of frame 32, while the opposite end is connected at 38 to the arm 33. Hence the arm 33, and the surface panel 34 at its terminus, will be urged outward, as shown by arrows I, of FIG. 2, in opposition to the inwardly directed forces of the interior surface 14 of the moulded hull 10 as it shrinks during cooling. FIG. 2 shows the condition in which the boat hull 10 is at ambient temperature, and hence the controlled reconfiguration during cooling has been completed. Adjustable stops 37 are provided to define the inward extent of arms 33, and hence the degree of shrinkage permitted by each of the surface panels 34 which collectively, via the intermediary semi flexible wall 35, define the desired configuration of the inner hull surface 14 when it is sufficiently cooled to ambient temperature.

Reference is now made to FIG. 4 which, in conjunction with FIG. 2, shows the operation of the outer hull cooling fixture 40. Although operationally similar to inner hull cooling fixture 30, it may be simplified by not requiring the substantial plurality and placement of the individual surface panels 34 within the inner hull cooling fixture 30. The outer hull cooling fixture 40 includes inwardly directed (as shown by arrows O of FIG. 2) surface panels 41 which include a rigid wall 42 connected to a framework of support members 43, which are in turn connected to movable frame 44. Biasing means 45, which may be a tension spring, elastic "bungee" type cord, air cylinder or other appropriate means, urge the two frame members 44 towards each other. This provides a force at the inwardly directed wall members 42 in opposition to the outwardly directed forces of the inner surface panels 34, to combinedly control the smooth reconfiguration of the hull 10 during shrinkage. Preferably a plurality of vent openings 46 are provided at appropriate locations within the outer hull fixture 40 to aid in the dissipation of the heat from the moulded hull during the cooling process. If desired, additional vent openings may also be provided in conjunction with the inner hull cooling fixture 30.

Figure 6:
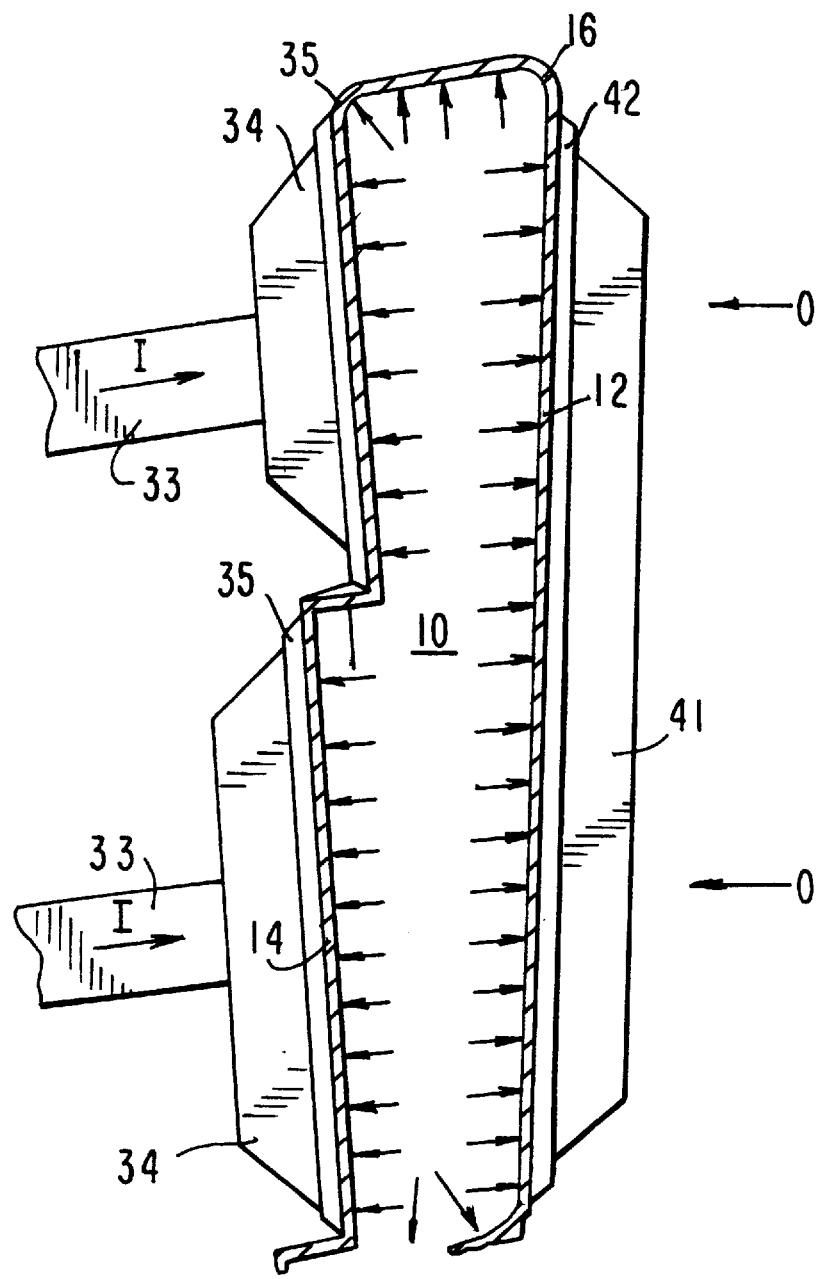
FIG. 6 is an enlargement of region A of FIG. 2, and shows the manner in which the maintenance of air pressure within the boat hull enhances the controlled reconfiguration provided by the cooling assembly during the hull cooling process.

Referring to FIG. 6, it is preferred that internal air pressure (eg. which may be in the order of 0.10 to 0.20 psi) be maintained within the hollow hull 10 during the cooling step. This advantageously serves to more evenly distribute the forces presented by the co-action of surface panels 34 and 41 over the hull surfaces during cooling induce shrinkage, resulting in a smoother surface.

Referring to FIG. 1, the apparatus of the present invention operates as follow, in conjunction with the rotational moulding of a boat hull which is the subject of aforementioned U.S. Pat. No. 5,458,844. It is naturally understood, however, that the present method and apparatus for the controlled reconfiguration of a moulded member may be utilized in conjunction with the controlled cooling of different types of boat hulls, and a variety of other large thermally moulded members.

After the unitary plastic boat hull is formed in the complementary inner and outer shell moulds, the boat hull and inner shell mould are removed as a subassembly, from the outer shell mould. This subassembly, which will be at an elevated temperature, is then placed in the outer mould cooling fixture 40, which will be at a lower, typically ambient, temperature. The inner shell mould is then removed. The inner hull cooling fixture 30, which will also typically be at ambient temperature, is then placed within and against the interior of the boat hull 10. Controlled forces are then automatically applied by the inner and outer moulded boat hull surfaces 34,41, as shown by arrows I & O of FIG. 2, while the moulded boat hull shrinks during the cooling process. When the boat hull has reached its desired ambient shape the movement of the inner hull cooling fixture members is stopped, by members 37. The inner cooling fixture 30 is then removed. Finally, the ambient temperature moulded hull 10 is removed from within the outer cooling fixture 40.

Accordingly, the present invention provides a method and apparatus for controlling the reconfiguration of a moulded boat hull structure as it cools down from the moulding temperature to ambient temperature, so it provide smooth surfaces over expansive areas.

Accordingly it should be understood that although the present invention has been described in conjunction with a specific embodiment, modifications in additions may be made thereto without departing from the scope of the present invention as defined in the appended claims.

What is claimed is:

1. A method for controlling the reconfiguration during cooling of a moulded boat hull structure having inner and outer hull surfaces, including the steps of:
   a. removing a moulded hull from a mould while the moulded hull is at an elevated temperature;
   b. placing the elevated temperature moulded hull in a cooling assembly having separate inner and outer hull cooling fixtures, each of which smoothly defines a desired final surface configuration for the hull when subsequently cooled to ambient temperature, each of the inner and outer hull cooling fixtures including a plurality of surface panels which are separately movable between initial and final positions, the initial positions correspond to surface configuration portions of the elevated temperature moulded hull structure when initially placed in the cooling assembly, and the final positions corresponding to the same portions of the desired surface configuration of the cooled ambient temperature moulded hull;
   c. forcefully applying each of the surface panels against its corresponding surface portion of the elevated temperature moulded hull while the surface panels are in their initial positions;
   d. controlling the movement of each of the surface panels towards its final position as the moulded hull cools to ambient temperature, and adjusts in size, while maintaining the application of force against their corresponding hull surface portions, such that the controlled movement of the surface panels guides shrinkage induced reconfiguration of the moulded hull between its elevated and ambient temperature; and
   e. removing the ambient temperature hull from the cooling assembly after said surface panels are in their final position.

2. The method according to claim 1, wherein individual biasing means automatically urge each of the surface panels from its initial position towards its final position, in conjuction with the cooling characteristics of, and resistance offered by, its corresponding portion of the moulded hull surface.

3. The method according to claim 2 wherein the biasing mean is provided by a tension member intermediate the individual surface panel and a stationary location on its respective hull cooling fixture.

4. The method according to claim 3, wherein the tension member is a spring.

5. The method according to claim 1, wherein the surface panels of said inner fixture collectively engage a flexible wall member which contacts a large inner hull surface area, with each surface panel having biasing means for urging a portion of the flexible wall member against the inner hull surface, the individual surface panels collectively moving the flexible wall member to smoothly reconfigure the inner boat hull surface during cooling induced shrinkage.

6. The method accordingly to claim 1, including the step of establishing the final positions of the surface panels and stopping the movement of each of the surface panels at its final position.

7. The method according to claim 1, wherein the boat hull is moulded of polyelthylene.

8. The method according to claim 7, wherein the elevated temperature is 160° to 170° F.

9. The method according to claim 8, wherein the duration for the moulded hull to cool between its elevated and ambient temperature is at least two hours.

10. The method according to claim 1 wherein the steps of removing the elevated temperature moulded hull from a mould and placing the moulded hull in the cooling assembly includes the steps of:

removing the moulded hull and an inner mould member as a sub-assembly out of an outer mould member;

placing the sub-assembly in the outer hull cooling fixture;

releasing the moulded hull from the inner mould member, and placing the inner hull cooling fixture within the moulded hull.

* * * * *